July 7, 1959
W. ERVINE
2,893,780
PICKUP TRUCK TELESCOPING CABIN UNIT
Filed Sept. 27, 1956
3 Sheets-Sheet 1
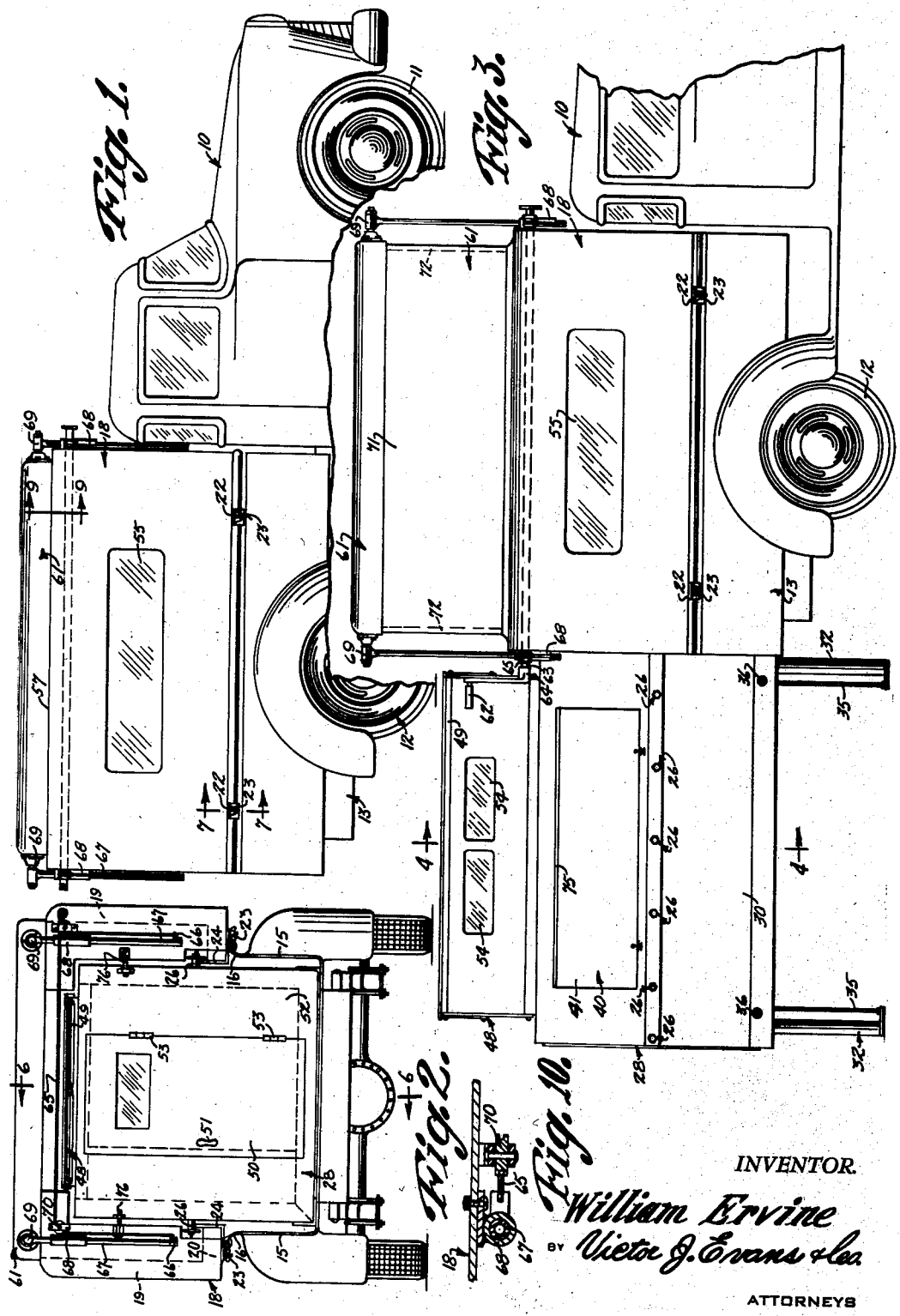
INVENTOR.
William Ervine
BY Victor J. Evans & Co.
ATTORNEYS

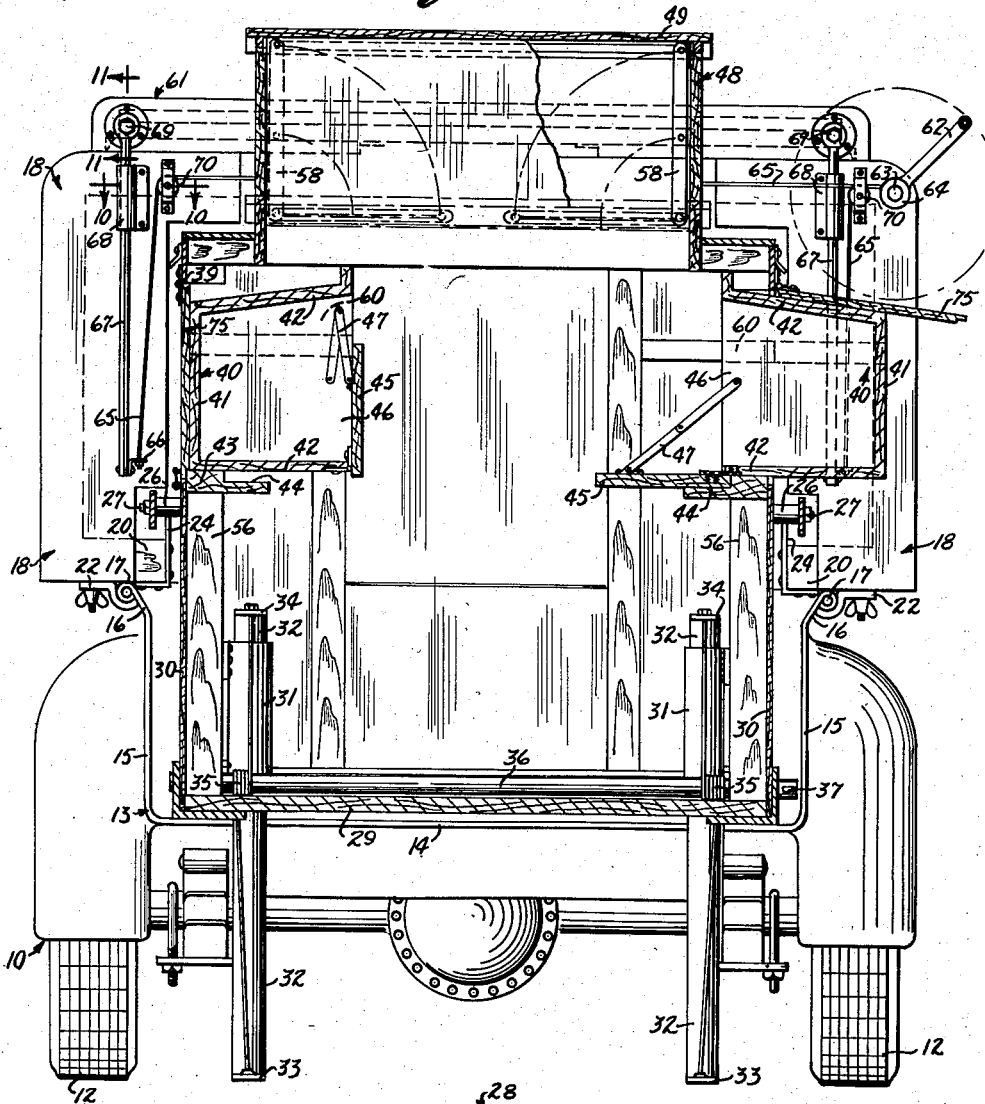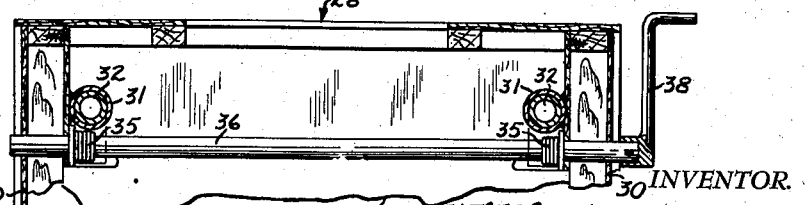

July 7, 1959
W. ERVINE
2,893,780
PICKUP TRUCK TELESCOPING CABIN UNIT
Filed Sept. 27, 1956
3 Sheets-Sheet 3
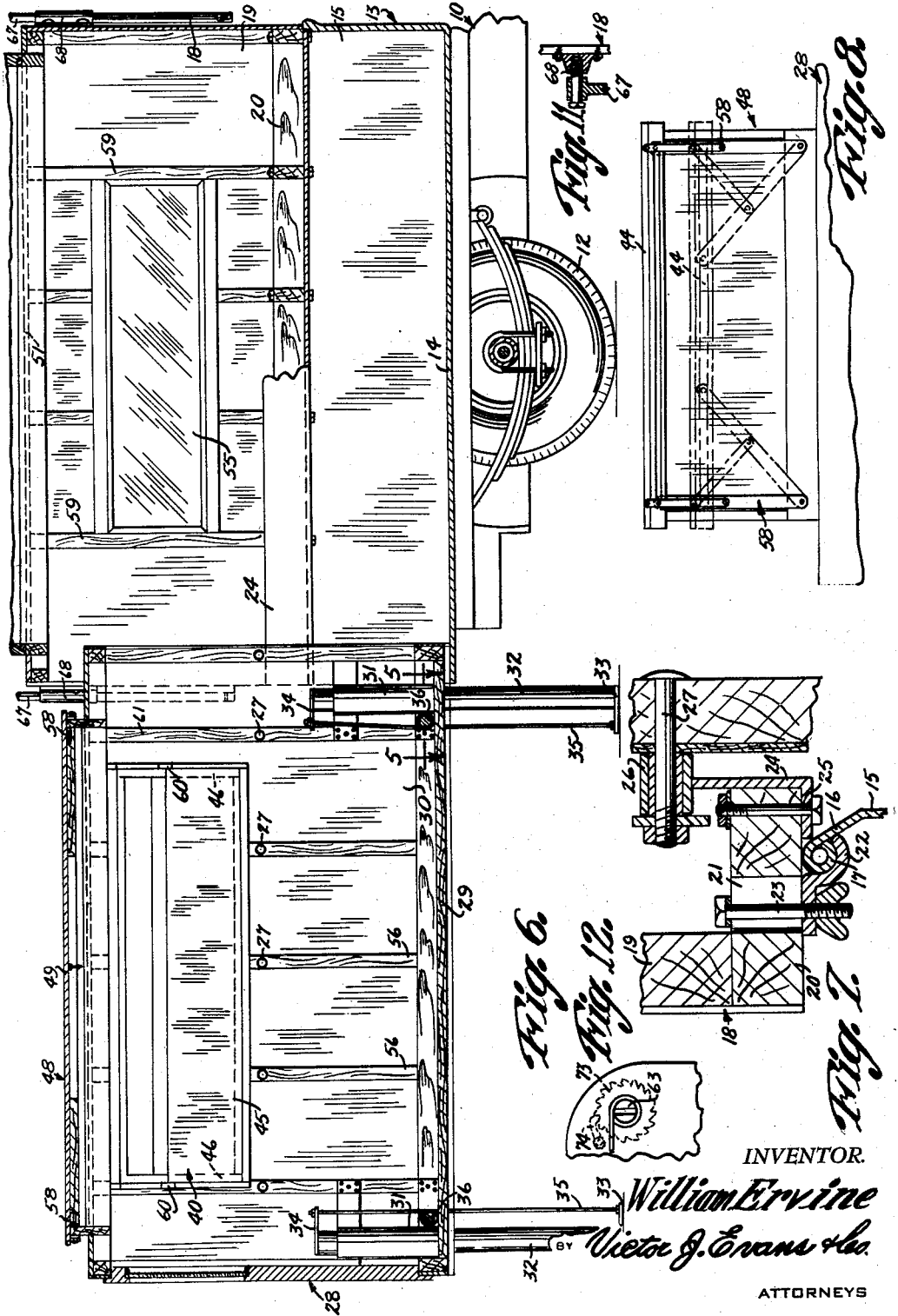
INVENTOR.
William Ervine
BY Victor J. Evans & Co.
ATTORNEYS United States Patent Office 2,893,780
Patented July 7, 1959

2,893,780

PICKUP TRUCK TELESCOPING CABIN UNIT

William Ervine, Billings, Mont.

Application September 27, 1956, Serial No. 612,463

6 Claims. (Cl. 296—23)

This invention relates to a vehicle, such as a pickup truck, and more particularly to a telescoping attachment for such a vehicle.

The object of the invention is to provide a telescoping attachment which is adapted to be mounted on a vehicle such as a pickup truck, whereby the assembly will prove especially beneficial to campers, huntsmen, or the like.

Another object of the invention is to provide a vehicle which is equipped with a means that permits a plurality of persons such as sportsmen to readily sleep, or eat or perform other functions in the vehicle, the present invention including a means which can be removed to an operative position when it is being used, and whereby when the apparatus is not being used, the parts can be moved to a collapsed or retracted position.

A further object of the invention is to provide a pickup truck which is equipped with an extensible housing whereby hunters, campers, or other persons such as sportsmen can readily move the parts to an extended position as when sleeping quarters are to be provided or when the vehicle is to be used for cooking meals or the like, so that with the present invention it is not necessary to use a trailer, tent or the like to accommodate the various needs of the sportsman.

A further object of the invention is to provide a sportsman's vehicle which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view illustrating the sportsman's vehicle of the present invention, and showing the parts in retracted position, as when the vehicle is being driven along a roadway or the like.

Figure 2 is a rear elevational view of the vehicle of the present invention.

Figure 3 is a view similar to Figure 1, but showing the position of the parts in extended position ready for use.

Figure 4 is a sectional view taken on the line 4—4 of Figure 3.

Figure 5 is a sectional view taken on the line 5—5 of Figure 6.

Figure 6 is a sectional view taken on the line 6—6 of Figure 2.

Figure 7 is a sectional view taken on the line 7—7 of Figure 1.

Figure 8 is a view illustrating certain constructional details of the cupola.

Figure 9 is a sectional view taken on the line 9—9 of Figure 1.

Figure 10 is a sectional view taken on the line 10—10 of Figure 4.

Figure 11 is a sectional view taken on the line 11—11 of Figure 4.

Figure 12 is a fragmentary elevational view illustrating the ratchet.

Referring in detail to the drawings, the numeral 10 designates a vehicle such as a pickup truck which is provided with the usual front wheels 11 and rear wheels 12, and the vehicle 10 includes a body 13 which may comprise a horizontally disposed bottom wall 14 and upwardly extending spaced parallel side walls 15, Figure 4. The upper portion of the side walls 15 terminate in outwardly extending sections 16 which are provided with the usual rolled edge 17, Figure 7. Connected to the rolled edges 17 are clamps 22, and securing elements such as bolt and nut assemblies 23 extend through portions of the clamps 22 and through slots 21 in the bottom members 20 of body members 18, Figure 7, and the body members 18 may include upright portions 19. The body members 18 are stationary and do not move. Secured to each of the body members 18 is an L-shaped beam or brace 24, and the beams 24 may be secured in place in any suitable manner, as for example by means of bolt and nut assemblies 25. The upper edges of the beams 24 engage rollers 26 which are secured in place by means of bolt and nut assemblies 27, Figure 7.

Telescopically connected to the pickup truck is a housing which is indicated generally by the numeral 28, and the housing 28 includes a horizontally disposed base 29 which has vertically disposed side members 30 extending upwardly therefrom, Figure 4. The bolts 27 which support the rollers 26, extend outwardly from the side members 30. Thus, it will be seen that by having the rollers 26 engage the means 24, there is provided a roller bearing contact between the movable housing 28 and the stationary body members 18.

There is further provided a means for supporting the housing 28 when the housing 28 is in its extended position. This means comprises sleeves 31 which extend upwardly from the base 29 and are secured thereto in any suitable manner. A standard or leg 32 is adjustably positioned in each of the sleeves 31, and lips 33 and 34 extend outwardly from the ends of the standards 32. Shafts 36 are journaled in the housing 28, and cables 35 are trained over the shafts 36, the ends of the cables 35 being connected to the lips 33 and 34. End portions of the shafts 36 may be slotted as at 37, and a crank 38 can be arranged in engagement with the slotted portion 37 of the shafts 36 when the shaft is to be rotated. Thus, when the shafts are not being rotated, the crank 38 can be removed. However, when the legs 32 are to be used for helping to support the housing 28 as when the housing 28 is in its extended position, the crank 38 can be used to rotate the shafts 36 so that the cables 35 will move the legs 32 downwardly in the sleeves 31 so that these legs will help to support the housing 28.

The side members 30 of the housing 28 are provided with cutouts or openings 39, and a casing 40 is movably or adjustably mounted in each of the cutouts 39. Each of the casings 40 includes a vertically disposed web 41 and substantially horizontal spaced parallel flanges 42. A horizontally disposed support member or brace 43 is secured within the housing 28 below each of the casings 40, and each of the support members 43 is provided with a recess 44, Figure 4. Doors 45 are mounted for movement into and out of closing relation with respect to the inner open ends of the casings 40, and the doors 45 may be hingedly connected to end pieces 46 of the casings 40 through the medium of links 47.

Mounted in the upper portion of the housing 28 is an extensible top section or cupola 48, whereby by extending or raising the cupola 48 to its extended position as shown in Figure 4, there will be increased head space or head room for occupants of the housing or vehicle. The extensible cupola 48 includes a top piece 49 which can be moved to raised or lowered position, and suitable linkage is provided for hingedly connecting the top piece 49 to the remainder of the apparatus.

A door 50 may be hingedly connected to the back end 52 of the housing 28 in any suitable manner, as for example by means of hinges 53, Figure 2, and the door 50 may be provided with a handle 51. The body for the vehicle may be provided with windows 55, and the cupola 48 may also have windows 54, Figure 3. Braces, such as the braces 56 may be arranged in the housing 28 for helping to reinforce or strengthen the parts thereof.

The numeral 57 designates the top of the vehicle body, while the numeral 58 designates the linkage which connects the top piece 49 of the top section to the remaining portion of the apparatus. Vertical braces 59 may be arranged in the body of the vehicle. For guiding the casings 40 as the casings move back and forth through the cutouts 39, there is provided lips or fingers 60.

In Figure 1 there is shown the pickup truck with the cabin unit retracted, while in Figure 3, there is shown the cabin unit withdrawn and in position for use. The cabin unit or housing 28 is provided with or includes the folding top section which provides additional standing height in the cabin. Suitable ventilating windows can be provided where desired. The slidable casings 40 can be used as cooking or eating tables or cabinets or for any other desired purpose. Furthermore, by extending the housing 28 to the position shown in Figure 3, additional area or space will be provided so that persons can comfortably sleep in the unit. The sliding connection between the roller 26 and the member 24 insures that there will be a smooth action between the moving parts. As shown in Figure 7, the bolt 23 passes through a slot 21 in the member 20 whereby adjustment can be made for parts of different sizes. If desired, air mattresses or the like can be used with the present invention. If desired, a folding top section can also be used at the top of the pickup truck body.

From the foregoing, it is apparent that there has been provided a sportsman's vehicle which is especially suitable for use by campers, hunters, fishermen or the like. In use, the vehicle 10 can be driven along a highway or can be driven over rough terrain to a desired location and then, when the vehicle is to be used in its extended position, as when the sportsmen or campers desire to cook a meal or sleep overnight or the like, the housing 28 can be extended or moved from the position shown in Figure 1 to the position shown in Figure 3. As previously described, the housing 28 is telescopically or slidably arranged in the body 13 of the vehicle 10. After the housing 28 has been moved to its extended position, the shaft 36 can be rotated by means of the cranks 38 whereby the legs 32 can be moved downwardly to the position shown in Figures 3, 4 and 6 so that these legs will help support the housing 28 when the housing 28 is in extended position. In actual practice, the rear legs can be lowered and then the truck moved forward to support the housing when the housing is slid out past its center of gravity and before the retractable supports are lowered. Or, the housing may be pulled out and supported manually while the rear legs are lowered if desired. The member 48 can be moved upwardly to its extended position so that this member will move from the position shown in Figure 6 for example to the position shown in Figures 3 and 4 whereby additional head room or head space is provided so that persons within the housing 28 will not accidentally bump their heads on the top of the housing. Furthermore, the casings 40 can be extended or moved outwardly as for example, a casing 40 can be moved outwardly to the position shown in the right hand side of Figure 4, and these casings 40 move outwardly through the cutouts 39. Then, the door 45 can be swung open from a vertical closed position to a horizontal position and these compartments can be used for any desired purpose. The rollers 26 engage the beams 24 so that as the housing 28 moves in or out of the vehicle body, there will be a minimum amount of friction and also the housing will be maintained in its proper alined position as it moves. The body members 18 are stationary, but the housing 28 is movable. The door 50 can be used for gaining access to the housing 28, and the various parts of the apparatus can be provided with windows such as the windows 54 and 55. After the housing has been used a desired length of time, the legs 32 can be raised by means of the manual rotation of the cranks 38 and then the housing 28 can have its member 48 retracted so that the housing 28 can be moved back inside the vehicle body 13 so that the vehicle can be driven away to any desired new location. The various compartments in the present invention can be used for preparing meals, eating, or sleeping in as desired or these compartments can be used for any other purpose.

The present invention is simple in design and in construction and has a low manufacturing cost and is constructed of lightweight material such as aluminum. With the parts arranged as shown in Figure 1, various equipment can be readily stowed in the vehicle, and when the cabin or housing 28 is moved to the position shown in Figure 3, it will provide a sleeping unit which will accommodate as many as four persons. Furthermore, the pickup unit is much more convenient than pulling a trailer since while a trailer may be all right on a highway, a trailer is not convenient to use when traveling off of the highway. With the small pickup unit of the present invention, a person can travel hills and mountains and have the camp equipment with him at all times so that it is not necessary to drive back to the trailer to camp. Furthermore, the pickup truck provides a means for transporting the game out of the camping area and this is difficult to do with an automobile or trailer. If desired, the housing 28 can be entirely disconnected from the main body of the pickup truck.

In the present invention, the main body 13 of the vehicle is also provided with an extensible cupola or cabin which is indicated generally by the numeral 61, and the cabin 61 is adapted to be raised and lowered by means of a crank or handle 62 which is mounted on a shaft 63, there being a pulley 64 on the shaft 63. Cables 65 are trained over the pulley 64, the cables 65 being connected to lugs 66 which are secured to the lower ends of vertically shiftable rods 67, the rods 67 being movably mounted in guide collars 68. The upper ends of the rods 67 are connected to the vertically shiftable cabin 61 through the medium of securing elements 69. The cables 65 are trained over guide pulleys 70, Figure 4.

The extensible cabin 61 is further provided with hingedly mounted side pieces 71 and hingedly mounted end pieces 72, Figure 9, so that as the cabin 61 is raised, the side pieces 71 and end pieces 72 will swing outwardly to provide an enclosed unit or cabin.

Arranged on the shaft 63 is a ratchet 73, Figure 12, and a dog 74 is mounted for movement into and out of engagement with the ratchet 73 so as to control rotation of the shaft 63 and control vertical shifting movement of the cabin 61. Hingedly mounted doors 75 are mounted for movement into and out of registry with the openings 39 in the walls 30. Latches or locks 76 are provided for retaining the housing 28 within the body 13 until the housing 28 is to be extended.

Thus, it will be seen that the body 13 includes the upwardly extensible and downwardly movable cabin 61 which can be raised by rotating the crank 62. Thus, this rotation of the crank 62 causes the pair of cables 65 to move the rods 67 upwardly in the guide collars 68 and since the upper ends of the rods 67 are secured to the cabin 61 by means of the bolts or pins 69, then this upward movement of the rods 67 will result in upward movement of the cabin 61. Thus, the cabin 61 can be raised whenever it is desired to increase the head space in the body. When it is desired to lower the cabin 61, the crank 62 can be rotated in the opposite direction whereby the rods 67 will move downwardly in the guide collar 68 so that the cabin 61 will return from the position shown in Figure 3, for example, to the position shown in Figures 1 and 4.

Furthermore, when the casing 40 is in the position shown in the left side of Figure 4, the hinged door 75 is in a vertical position, but when the casing 40 is moved outwardly, as for example, as shown in the right side of Figure 4, then the hinged door 75 will spring upwardly. When the cabin 61 is raised, the hingedly mounted side pieces 71 and the hingedly mounted end pieces 72 will swing outwardly so as to provide a complete enclosed unit for the top portion of the vehicle body. By means of the dog 74 which engages the teeth of the ratchet 73, Figure 12, the cabin 61 can be maintained immobile in its various adjusted position. The locks 76 can be used for retaining the housing 28 within the body 13.

The crank 62 can be removed when desired from the shaft 63. The ratchet shown in Figure 12 can be used for holding the cabin 61 in raised position as when the side and end pieces 71 and 72 are being adjusted. The doors 75 cover the openings 39 when the casings 40 are in their inner position. Thus, in the event that the vehicle is used without the casing 40 or with the casing 40 removed, then the door 75 can be used to provide access to the interior of the apparatus. The cabin 61, when in retracted or lowered position, projects above the cab of the vehicle but nevertheless the cabin 61 is sufficiently low so that the vehicle can be driven into a garage or the like.

I claim:

1. In combination with a vehicle of the pickup type including a body, said body including a horizontally disposed floor, vertically disposed side walls terminating in outwardly inclined portions provided with rolled edges, a housing telescopically connected to said body, and including a horizontally disposed base and vertically disposed side members, a clamp operatably connected to each of said rolled edges, a support member operatably connected to each clamp and including an L-shaped beam, a plurality of rollers extending outwardly from the side members of said housing, said rollers engaging the upper edge of said beams, there being opposed cutouts in said side members, a hollow casing adjustably mounted in each of said cutouts and each casing including an outer vertically disposed web and substantially horizontal spaced parallel flanges extending inwardly from said web and secured thereto, said casing being of substantial size so as to permit enlargement of the usable living space in the housing, a horizontally disposed brace secured to the inner surface of each of said side members and positioned below said casing, each of said braces being provided with a recess, and doors hingedly connected to said casings and mounted for movement into and out of registry with the recesses in said braces said doors being in a vertical position when the casings are in retracted position, and said doors being in a horizontally disposed position when the casings are in extended position, said casings being adjustable in a horizontal plane.

2. The structure as defined in claim 1 and further including a vertically extensible dome-like member arranged in the upper portion of said housing.

3. The structure as defined in claim 1 and further including a plurality of vertically disposed sleeves extending upwardly from the base of said housing, a standard slidably mounted in each of said sleeves, horizontally disposed lips extending outwardly from the ends of said standards, a pair of spaced parallel horizontally disposed shafts journaled in the lower portion of said housing, cables trained over said shafts and connected to said lips, and manually operable cranks detachably connected to the ends of said shafts.

4. In combination with a vehicle of the pickup type including a body, said body including a horizontally disposed floor, vertically disposed side walls terminating in outwardly inclined portions provided with rolled edges, a housing telescopically connected to said body and including a horizontally disposed base and vertically disposed side members, a clamp operatably connected to each of said rolled edges, a support member operatably connected to each clamp and including an L-shaped beam, a plurality of rollers extending outwardly from the side members of said housing, said rollers engaging the upper edge of said beams, there being opposed cutouts in said side members, a hollow casing adjustably mounted in each of said cutouts and each casing including an outer vertically disposed web and substantially horizontal spaced parallel flanges extending inwardly from said web and secured thereto, said casings being of substantial size so as to permit enlargement of the usable living space in the housing, a horizontally disposed brace secured to the inner surface of each of said side members and positioned below said casing, each of said braces being provided with a recess, and doors hingedly connected to said casings and mounted for movement into and out of registry with the recesses in said braces, said doors being in a vertical position when the casings are in retracted position, and said doors being in a horizontally disposed position when the casings are in extended position, said casings being adjustable in a horizontal plane, a vertically extensible dome-like member arranged in the upper portion of said housing, vertically disposed sleeves extending upwardly from the base of said housing, a standard slidably mounted in each of said sleeves, lips extending outwardly from the ends of said standards, a pair of horizontal shafts journaled in the lower portion of said housing, cables trained over said shafts and connected to said lips, a crank for operating said shafts, a door hingedly connected at the rear of said housing, and windows in said cupola and vehicle body.

5. In combination with a vehicle of the pickup type including a body, said body including a horizontally disposed floor, vertically disposed side walls terminating in outwardly inclined portions provided with rolled edges, a housing telescopically connected to said body and including a horizontally disposed base and vertically disposed side members, a clamp operatably connected to each of said rolled edges, a support member operatably connected to each clamp and including an L-shaped beam, a plurality of rollers extending outwardly from the side members of said housing, said rollers engaging the upper edge of said beam, there being opposed cutouts in said side members, a hollow casing adjustably mounted in each of said cutouts and each casing including an outer vertically disposed web and substantially horizontal spaced parallel flanges extending inwardly from said web and secured thereto, said casings being of substantial size so as to permit enlargement of the usable living space in the housing, a horizontally disposed brace secured to the inner surface of each of said side members and positioned below said casing, each of said braces being provided with a recess, and doors hingedly connected to said casings and mounted for movement into and out of registry with the recesses in said braces, said doors being in a vertical position when the casings are in retracted position, and said doors being in a horizontally disposed position when the casings are in extended position, said casings being adjustable in a horizontal plane, a vertically extensible top section arranged in the upper portion of said housing, vertically disposed sleeves extending upwardly from the base of said housing, a standard slidably mounted in each of said sleeves, lips extending outwardly from the ends of said standards, a pair of horizontal shafts journaled in the lower portion of said housing, cables trained over said shafts and connected to said lips, a crank for operating said shafts, a door hingedly connected at the rear of said housing, windows in said top section and vehicle body, a vertically shiftable cabin connected to the body of the vehicle and said cabin including hingedly mounted side pieces and hingedly mounted end pieces so that as the cabin is raised, the side pieces and end pieces will swing outwardly, vertically slidable rods connected to said cabin, guide collars for suporting said rods, cables connected to said rods, and a manually operable crank for moving said cables.

6. A vehicle embodying a body, a housing telescopically connected to said body, leg means for supporting said housing when the housing is in extended position, and manually operable means for raising and lowering said leg means, a vertically extensible top section in the top of said housing, and laterally adjustable casings slidably connected to said housing, a vertically adjustable cabin connected to the body of the vehicle; said cabin embodying hingedly mounted side pieces and hingedly mounted end pieces so that as the cabin is raised, the side pieces and end pieces will swing outwardly, and manually operable means for raising and lowering said cabin.

References Cited in the file of this patent

UNITED STATES PATENTS

| | | |
|---|---|---|
| 467,423 | Merritt | Jan. 19, 1892 |
| 559,966 | Bierstadt | May 12, 1896 |
| 1,964,894 | Rohne | July 3, 1934 |
| 1,972,415 | Anderson | Sept. 4, 1934 |
| 2,136,130 | Gorlenko | Nov. 8, 1938 |
| 2,739,833 | Schenkel et al. | Mar. 27, 1956 |